United States Patent [19]
Hull et al.

[11] Patent Number: 5,600,491
[45] Date of Patent: Feb. 4, 1997

[54] THERMAL IMAGING SYSTEM FOR A MILITARY VEHICLE

[75] Inventors: David A. Hull, Manhattan Beach; Richard R. Smith, Los Angeles; Mark R. Ehlers, Gardena; Michael J. Brothers, Torrance; Kenneth W. Lee, Whittier; Dietmar Hanke, Mission Viejo, all of Calif.

[73] Assignee: Hughes Electronics, Los Angeles, Calif.

[21] Appl. No.: 430,791

[22] Filed: Apr. 28, 1995

[51] Int. Cl.$^6$ .................................. G02B 15/14
[52] U.S. Cl. .......................... 359/698; 359/683
[58] Field of Search ............................ 359/698, 705, 359/683, 685, 697, 820; 354/222

[56] References Cited

U.S. PATENT DOCUMENTS

| | | | |
|---|---|---|---|
| 4,114,171 | 9/1978 | Altman | 354/152 |
| 4,478,493 | 10/1984 | Yokota | 354/222 |
| 4,949,107 | 8/1990 | Kitagishi | 354/79 |
| 5,117,247 | 5/1992 | Nakai | 354/222 |
| 5,276,760 | 1/1994 | Yokota | 385/119 |

Primary Examiner—Georgia Y. Epps
Assistant Examiner—Ricky Mack
Attorney, Agent, or Firm—Michael W. Sales; Wanda K. Denson-Low

[57] ABSTRACT

A thermal imaging system (100) for a vehicle includes an objective lens (104) for receiving an image of the object, an eyepiece lens (102) for viewing the image of the object, and a compensator lens (106) movably located between the objective and eyepiece lenses (104, 102) for providing a thermal image of the object. The system (100) includes a servo motor control system (107, 109, 110, 112 and 114) for controlling the position of the compensator lens (106) based upon temperature, range and field of view to provide an accurate thermal image of the object.

11 Claims, 3 Drawing Sheets

THERMAL IMAGING SYSTEM FOR A MILITARY VEHICLE

BACKGROUND OF THE INVENTION

1. Field of the Invention

The present invention relates to imaging systems and more particularly to thermal imaging systems for military applications.

2. Description of the Related Art

There is an ever increasing demand for robust performance from infrared (IR) sensors for military applications. Range of detection and range of recognition, for example, are two critical performance parameters for a tank operating in a terrain with long ranges of open space, e.g., a desert environment. A conventional IR imaging system for a typical tank provides for three to 10 times magnification. Typically this magnification is provided in two fields of view, with each field of view being the angular extent of an area viewable by the sensor.

With a single optical arrangement, an increase in the range of magnification necessarily limits the field of view. In addition, resolution is limited in such a system as the magnification increases.

The importance of high optical performance and the cost of tanks and other military vehicles mandate a retrofit of existing vehicles. However, a practical problem facing the manufacturer of a thermal imaging system is that any new system must conform within the aperture and dimensionality constraints or "form factor" of the vehicles. This problem has been addressed by the use of a multiple field of view optical arrangement by which different sets of lens are substituted within the housing depending on the desired range or field of view.

Unfortunately, this requires the user to manually replace one set of lenses with the other and also possibly requires the manual focusing (compensation) thereof.

Accordingly, what is needed is an improved thermal imaging system that affords various powers of magnification and fields of view within conventional form factor constraints which has an automatic focus compensation.

SUMMARY OF THE INVENTION

The need in the art is addressed by the present invention which provides an improved three field of view thermal imaging system for a vehicle. The invention provides a thermal imaging system that affords various powers of magnification and fields of view within conventional form factor constraints which has an automatic focus compensation. The invention comprises a first lens for receiving an image of an object, a second lens for viewing the image of the object, and a compensator arrangement for adjusting for changes in the operating characteristics of the first and second lens.

In a particular embodiment, the compensator arrangement includes a third lens which is movably located between the first and second lenses. The position of the third lens is controlled in response to changes in magnification, field-of-view and temperature of the first and second lenses to provide an accurate thermal image of an object.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

Figure 1:
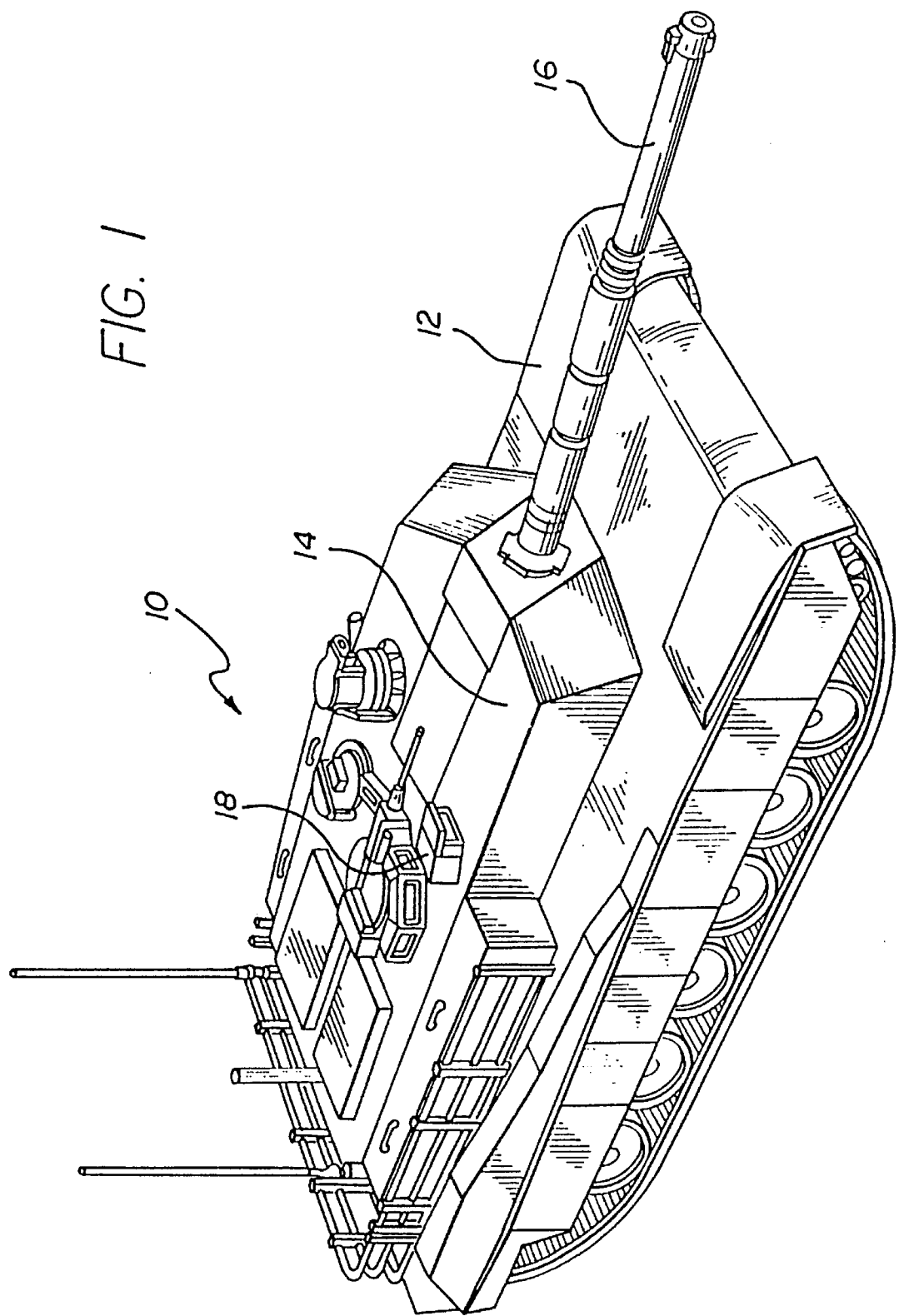
FIG. 1 is an isometric view of an M1A2 Abrams Main Battle Tank illustrating the gunner's external viewing port.

Referring now to FIG. 1 there is illustrated an M1A2 Abrams Main Battle tank 10 comprising a hull 12 to which is mounted a rotatable turret 14. Mounted to the turret is an M256 120 mm main gun 16. Among other things projecting from the top of the turret is an external viewing port 18 through which a gunner seated inside the turret is able to sight the main gun. Mounted beneath the external viewing port is an optical gun sight having a thermal imaging system. The thermal imaging system allows the gunner inside the turret to see targets not only in normal daylight but also at night or through the dust or smoke of battle. The system does this by picking up heat and light emitted by targets.

Figure 2:
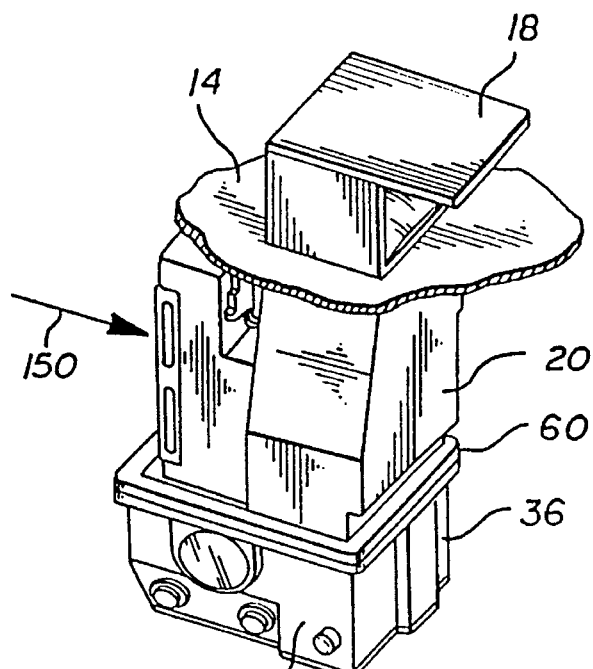
FIG. 2 is an enlarged isometric view of the external viewing port and a breakaway showing the fixed internal upper housing and the lower housing of the present invention.
Figure 3:
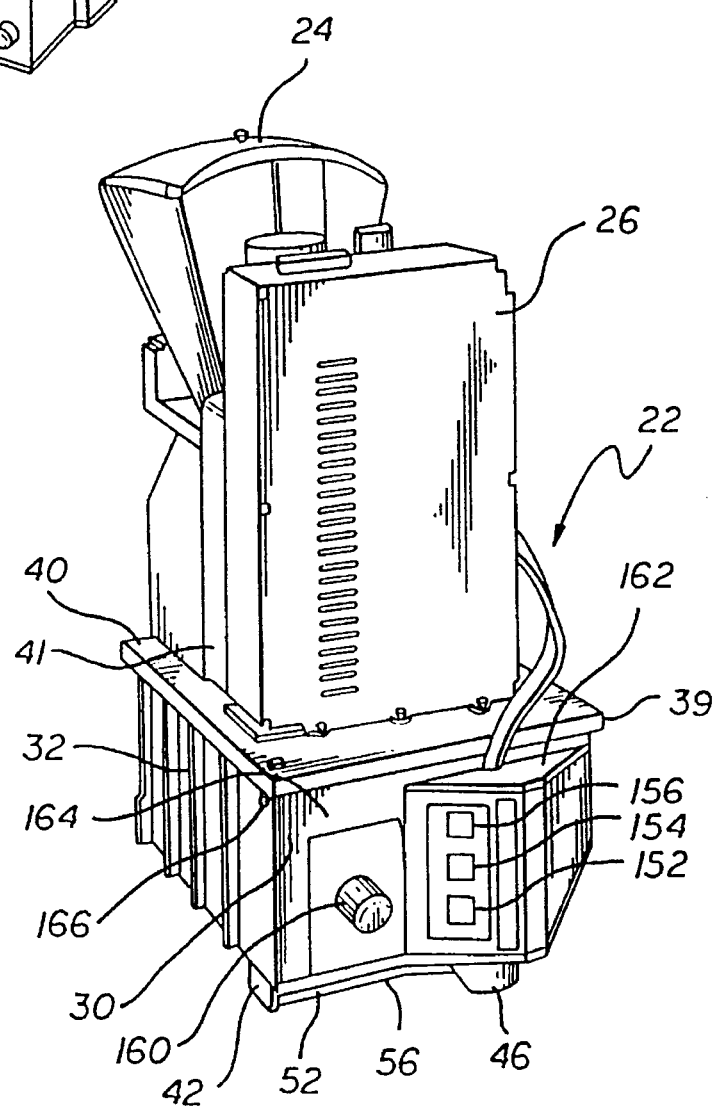
FIG. 3 is an isometric view of the lower housing of the present invention and the lens system and associated electronics from a viewpoint opposite that shown in FIG. 2.

Referring now to FIG. 2 an enlarged view of the external viewing port 18 is shown. Fixed inside the turret is an internal upper housing 20. Fastened to the upper housing is a new lower housing 22 in accordance with the present invention. In FIG. 3, the lower housing 22 is shown detached from the upper housing and turned approximately 180 degrees. Illustrated is the mounting of a three field-of-view lens system 24 and a chassis 26 containing the accessory electronics to operate the lens system.

FIG. 3 also illustrates the advantageous packaging of the lens system and electronics in the lower housing. The lower housing 22 is made of cast aluminum and is extremely rugged. It is constructed of four wall portions, a front wall 30, a left side wall 32, a right side wall 34 (FIG. 2), and a back wall 36 (FIG. 2). The walls have a length and height to enclose the lower portion of the lens system and electronics.

Mounted atop the four wall portions and integral therewith is a flange 39 having an upper surface 40 with a plurality of openings, such as the hole 41, for receiving bolts. The flange 39 extends completely around the lower housing. Connected to the bottom of the four walls, either by bolts or by being cast integrally, is a bottom portion. Preferably the bottom portion is in the form of a plate 42. The four walls and the bottom plate form a box with an opening at the top bordered by the flange 39. This housing assembly is described in more detail in U.S. patent application Ser. No. 08/431,251 entitled, "Gun Sight System for a Military Vehicle" which is incorporated by reference herein and filed herewith (Attorney Docket No. PD 94492).

A three field of view thermal imaging system 100 in accordance with the present invention provides for increased accuracy over conventional thermal imaging systems without requiring manual focusing as one switches from one magnification (field of view) to another. As mentioned above, typically the magnification of such a military imaging system is between 3 and 10. The present invention utilizes a telescope with a fixed medium field of view and a circuit which compensates for changes in the field of view, the temperature and/or the range to assure that the highest resolution picture image available is provided.

Figure 4:
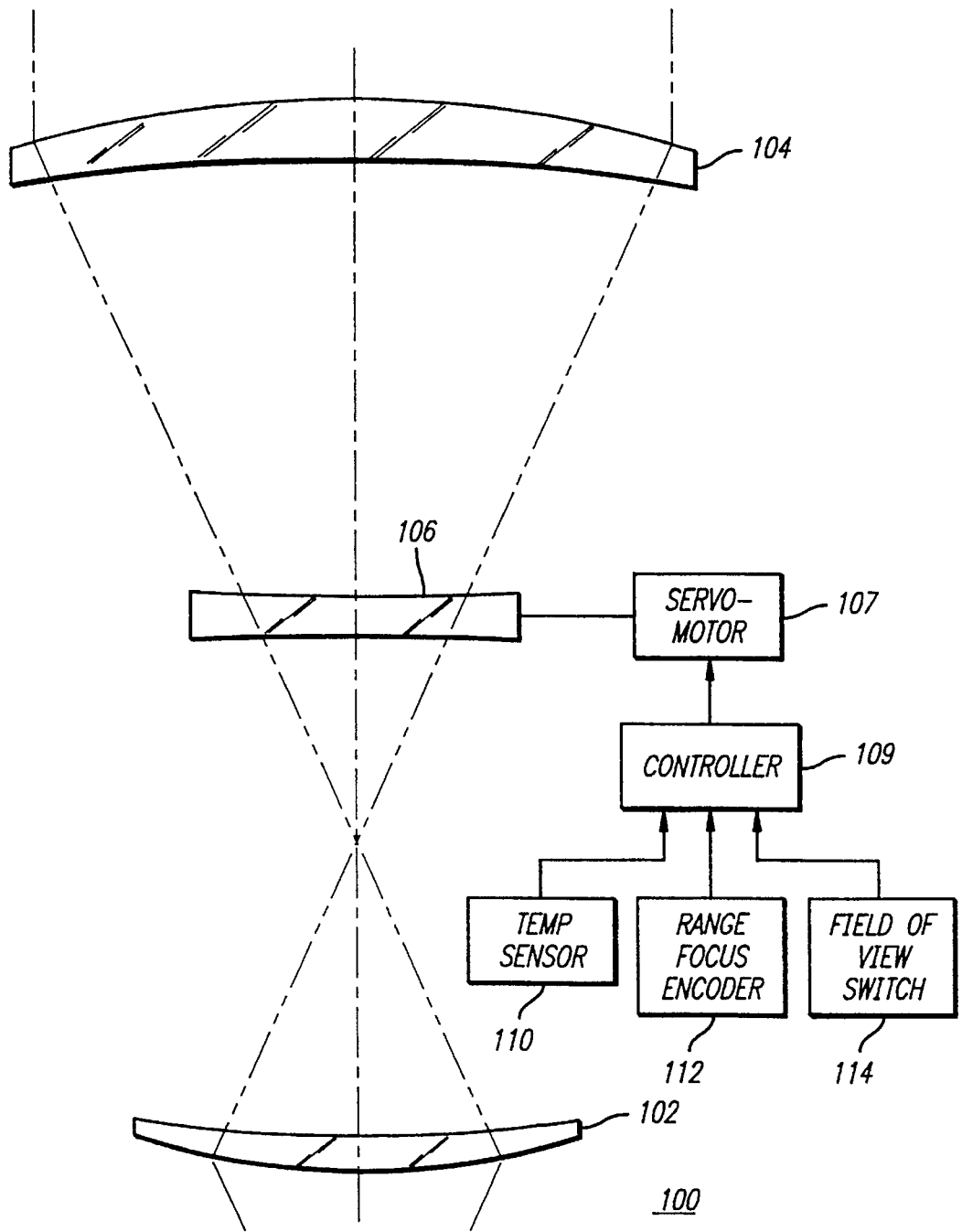
FIG. 4 is a diagrammatic depiction of a thermal imaging system in accordance with the present invention.

To more particularly describe the operation of such a system 100, please refer to the following description in conjunction with FIG. 4. The thermal imaging system 100 includes a three field of view telescope such as the one disclosed in U.S. patent application Ser. No. 08/363,846, entitled "Three Field of View Refractive IR Telescope with Fixed Medium Field of View," filed Dec. 27, 1994, which has a fixed medium field of view (MFOV). The thermal imaging system 100 can also include a refractive lens cradle for isolating the telescope's refractive lenses from vibration and shock. A typical refractive lens cradle which can be utilized with the system 100, is disclosed in U.S. patent application Ser. No. 08/395,408, entitled "Refractive Lens Cradle," filed Feb. 27, 1995. All of the above-identified patent applications are incorporated by reference herein.

Referring now to FIG. 4, as is seen, the thermal imaging system 100 further comprises an eyepiece lens 102 and an objective lens 104 for providing the images thereto. There are oftentimes other intermediate lenses in between these two lenses to further provide clarity. In addition, there is a focusing lens, the compensator lens 106 in accordance with the present invention which is adjusted by a conventional servo motor 107 under control of a controller 109 to provide for improved clarity. The controller 109 receives inputs from a temperature sensor 110, a range and focus encoder 112 and a field of view switch 114. The controller 109 can be a hard wired device or a microprocessor which is utilized to execute the algorithm for appropriate movement of the compensator lens. For example, controller 109 can be implemented in a variety of manners including hardware systems (combinational logic or lookup tables) or software. The servo motor 107 can be any physical device which is capable of positioning the lens 106.

The compensator lens 106 position as a function of temperature is provided via the temperature sensor 110. Thereafter, the compensator position as a function of range is provided via a range encoder 112. Finally the compensation position as a function of field of view is provided via field of view switch 114. Position (R,ΔT) is relative to the position of the lens at the time of assembly on an optical bench at a given temperature and focus. As a result, a three field of view thermal imaging system 100 is provided that has increased accuracy over conventional two field of view systems.

The following will describe the overall operation and the particular equations that will be utilized by the controller 109 to provide for accurate detection and observation of an object. The actual position controls generated by the controller 109 for a typical tank are shown below:

Focus Algorithm Parameters:

| | |
|---|---|
| Optical zero (inches) | 0.2246 |
| Setup temperature (C.) | 20 |

-continued

| | WFOV | MFOV | NFOV |
|---|---|---|---|
| Slope of temperature curve (m) | 9.1021E-04 | 1.7792E-03 | 1.5236E-03 |
| Intercept of temperature curve (b) | −5.3117E-04 | −1.8122E-03 | −1.2650E-03 |
| Range coefficient (B) | −9.9960E-02 | −1.5232E+00 | −1.523E+00 |
| Range exponent (a) | −9.2383E-01 | −9.9545E-01 | −9.9545E-01 | where:

m=slope of the temperature curve, b=intercept of the temperature curve,

B=range coefficient, a=range exponent,

T=temperature, the position feedback circuit scale factor (Vin.)=7.984,

WFOV=wide field of view,

MFOV=medium field of view, and

NFOV=narrow field of view.

One of ordinary skill in the art will readily recognize that these parameters are specifically for a particular tank. Other parameters could be used within the spirit and scope of the present invention. From these particular parameters a variety of information can be determined that will allow for the thermal imaging system to operate efficiently.

Focus Algorithm

A general form of the compensator 106 position equation is:

$$\text{Position } (R, \Delta T) = B \times R^1 + m \times \Delta T + b + \text{optical zero} \quad [1]$$

This equation is applied for each field of view. As is shown in Focus Algorithm parameters shown above, 'B' and 'a' are the same for medium field of view (MFOV) and the narrow field of view (NFOV). Values for 'm' and 'b' are unique for each FOV. In a preferred embodiment, the feedback amplifier, located on the FOV/Focus board converts compensator position to a voltage via a position feedback potentiometer located inside the focus actuator.

Temperature Algorithm $$\text{Position}(T) = m \times \Delta T + b \quad [2]$$

Range Algorithm $$\text{Position } (R) = B \times R^a \quad [3]$$

The predicted values for the range are those generated by the range equation derived above. Position is the desired position of the compensator based on analysis.

Accordingly, a thermal imaging system in accordance with the present invention is provided that allows for accurate detection and observation of an object. By providing for a compensator lens which is movable by a servo motor based upon conditions such as temperature range and switching between narrow range and medium and wide field of views (FOVs) the distance and resolution of the thermal imaging system is greatly enhanced.

The present invention has been described herein with reference to a particular embodiment for a particular application. Those having ordinary skill in the art and access to the present teachings will recognize additional modifications, applications and embodiments within the scope thereof. It is therefore intended by the appended claims to cover any and all such applications, modifications and embodiments.

Accordingly, many modifications may be made by one of ordinary skill in the art without departing from the spirit and scope of the present invention, the scope of which is defined by the appended claims.

What is claimed is:

1. A thermal imaging system for a vehicle comprising:

a first lens for receiving an image of an object;

a second lens in optical alignment with the first lens for viewing the image of the object; and means in optical communication with said first and second lens for compensating for changes in the optical performance thereof, wherein said means for compensating includes:

a third lens;

means for moving said third lens, said means for moving including a position actuator and a controller for same; and a sensor for receiving temperature information and providing a voltage representative of temperature information to the controller.

2. The invention of claim 1 wherein said means for compensating includes means for compensating for changes in the magnification of the first and second lens.

3. The invention of claim 1 wherein said means for compensating includes means for compensating for changes in the field-of-view of the first and second lens.

4. The invention of claim 1 wherein said means for compensating includes means for compensating for changes in the temperature of the first and second lens.

5. The invention of claim 1 wherein the third lens is a compensator lens.

6. A thermal imaging system for a vehicle comprising:

a three field of view (FOV) telescope including a wide field of view (WFOV), a narrow field of view (NFOV), and a fixed medium field of view (MFOV);

a compensator lens movably located within the three FOV telescope for providing an accurate thermal image of the object; and a control means for controlling the position of the compensator lens, the control means further comprising:

a servo motor coupled to the compensator lens for moving the compensator lens, a microcontroller for controlling the servo motor, a sensor for receiving temperature information for and providing a voltage representative of the temperature information to the microcontroller, a range encoder for providing information regarding the distance of the object to the microcontroller, and a switch means coupled to the microcontroller for switching the three FOV telescope between the WFOV, NFOV, and the fixed MFOV.

7. The thermal imaging system of claim 6, further comprising a refractive lens cradle for isolating the three FOV telescope from vibration and shock.

8. A thermal imaging method for a vehicle comprising the steps of:

(a) receiving an image of object on a first lens;

(b) viewing the image of a object on a second lens;

(c) receiving information about the object related to temperature, range, or field of view; and (d) moving a third lens located between the first and second lenses to provide an accurate thermal image of the object based upon step (c).

9. A thermal imaging system for a vehicle comprising:

a first lens for receiving an image of an object;

a second lens in optical alignment with the first lens for viewing the image of the object; and means in optical communication with said first and second lens for compensating for changes in the optical performance thereof, wherein said means for compensating includes:

a third lens;

means for moving said third lens, said means for moving including a position actuator and a controller for same; and range encoder means for providing information regarding the distance of the object to the controller.

10. A thermal imaging system for a vehicle comprising:

a first lens for receiving an image of an object;

a second lens in optical alignment with the first lens for viewing the image of the object; and means in optical communication with said first and second lens for compensating for changes in the optical performance thereof, wherein said means for compensating includes:

a third lens;

means for moving said third lens, said means for moving including a position actuator and a controller for same; and a switch means coupled to the controller for switching the thermal imaging system between a plurality of field of views.

11. A thermal imaging system for a vehicle comprising:

a first lens for receiving an image of an object;

a second lens in optical alignment with the first lens for viewing the image of the object; and means in optical communication with said first and second lens for compensating for changes in the optical performance thereof, wherein said means for compensating includes means for compensating for changes in the temperature of the first and second lens.

* * * * *